United States Patent [19]

Ghatta et al.

[11] Patent Number: 5,739,269
[45] Date of Patent: Apr. 14, 1998

[54] PROCESS FOR THE PRODUCTION OF POLYESTER RESINS

[75] Inventors: Hussain Al Ghatta, Fiuggi; Dario Giordano, Tortona, both of Italy

[73] Assignee: Sinco Engineering, S.p.A., Italy

[21] Appl. No.: 865,390

[22] Filed: May 29, 1997

[30] Foreign Application Priority Data

May 30, 1996 [IT] Italy .................... MI96A1098

[51] Int. Cl.$^6$ ...................................... C08F 6/00
[52] U.S. Cl. .................... 528/492; 528/296; 528/302; 528/308; 528/481; 528/491; 528/492; 528/503; 525/437
[58] Field of Search ...................... 528/296, 302, 528/308, 481, 491, 492, 503; 525/437

[56] References Cited

U.S. PATENT DOCUMENTS

| | | |
|---|---|---|
| 4,064,112 | 12/1977 | Rothe et al. |
| 4,161,578 | 7/1979 | Herron |
| 4,374,975 | 2/1983 | Duh ........................... 528/272 |
| 5,243,020 | 9/1993 | Ghisolfi |
| 5,334,669 | 8/1994 | Ghisolfi |
| 5,338,808 | 8/1994 | Ghisolfi |
| 5,547,652 | 8/1996 | Ghisolfi et al. |

FOREIGN PATENT DOCUMENTS

0422282B1  5/1995  European Pat. Off.

*Primary Examiner*—Samuel A. Acquah
*Attorney, Agent, or Firm*—Edward D. Manzo; Mark J. Murphy

[57] ABSTRACT

Process for the production of aromatic polyester resins by polycondensation in the solid state of resins with intrinsic viscosity comprised between 0.1 and 0.45 dl/g, in which the ratio by weight between the hourly flow speed of the inert gas fed to the reactor and the hourly flow speed of the fed polymer is comprised between 0.1 and 0.6.

20 Claims, 1 Drawing Sheet

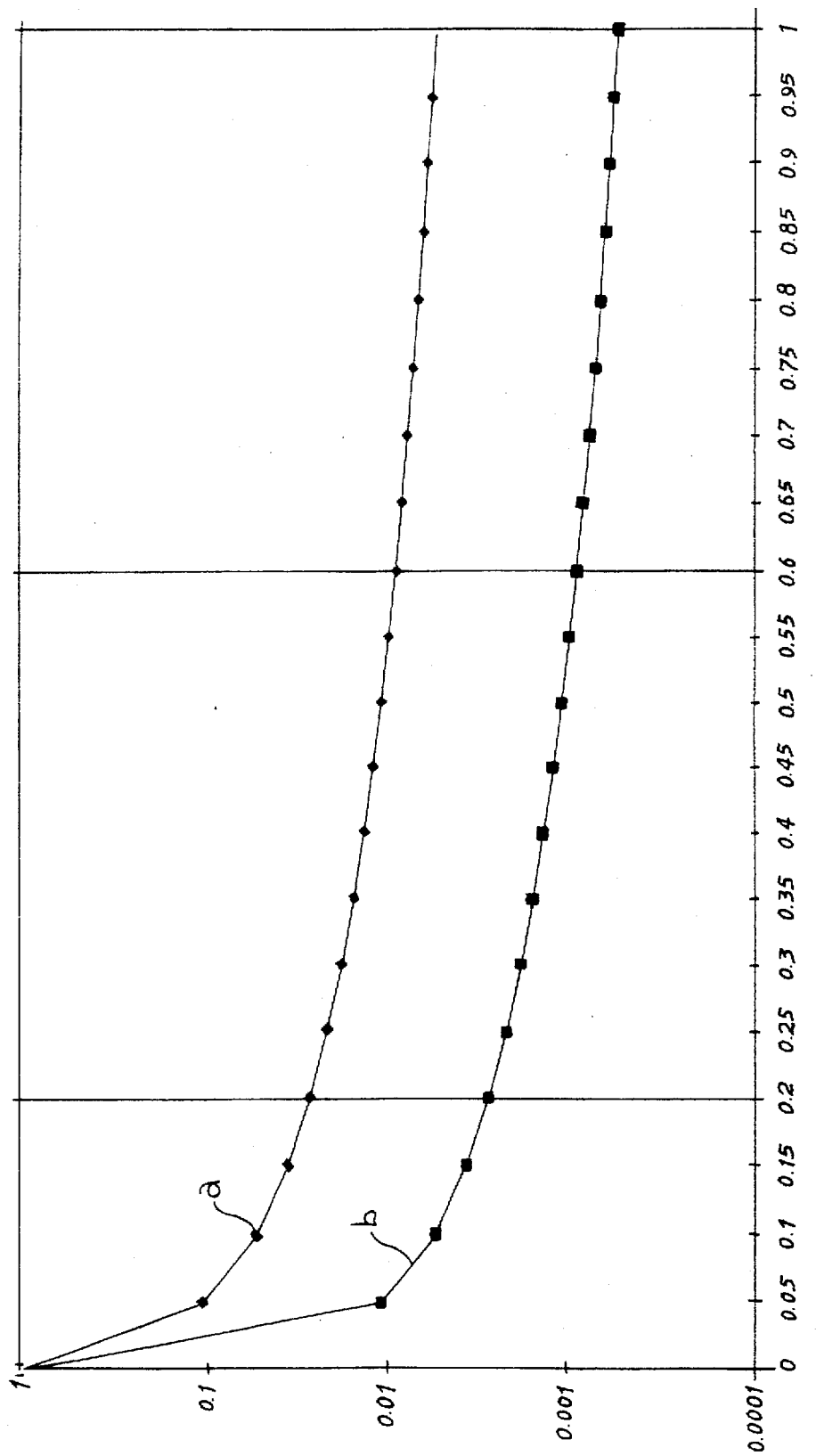

PROCESS FOR THE PRODUCTION OF POLYESTER RESINS

The present invention refers to an improved process for the polycondensation in the solid state of polyester resins.

The aromatic polyester resins, particularly three of them the polyethylene terephtalate (PET), the copolymers of terephtalitic acid with lower proportion of isophthalic acid and the polybutylene terephtalate find wide application in both the fibre and film fields and as material for molding.

While for the fibres and films the intrinsic viscosity of the resin is in general comprised between 0.6–0.75 dl/g, for the material for molding are necessary higher values that are difficult to obtain directly by means of polycondensation in the melt state.

The intrinsic viscosity is taken to desired values (generally higher than 0.75 dl/g) by means of polycondensation in the solid state of the resin (SSP) operating at temperatures generally comprised between 190° and 230° C.

The elimination of the products of polycondensation reaction is an essential requirement for the development of the same reaction.

Various reactions occur during the polycondensation. The main reaction that leads to the increase in molecular weight of PET is the elimination of ethylene glycol

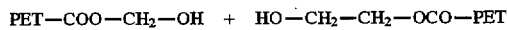

Other reactions lead to the esterification of the terminal carboxylic groups and to the formation of acetaldehyde.

As already indicated, the by-products of the polycondensation reaction are eliminated by passing a flow of gas downstream or upstream with the feeding of the polymer exiting from the crystallization stage.

The polycondensation reaction is generally carried out in a longitudinal fluid-bed reactor wherein the polymer enters from above and goes out from below and a flow of inert gas is made to pass over the polymer.

Processes like this one are known for example from U.S. Pat. No. 4,064,112 in which the granular polymer is crystallized to a density sufficiently high to reach at least 1.390 g/cm$^3$ operating in forced movement crystallizers heated to a temperature between 220° and 260° C. and conducting then the polycondensation reaction in fluid-bed reactor operating at temperatures equal or lower than the ones used in the crystallization stage.

In the crystallization stage the operation is carried out at temperature between 230° and 245° C. in order to obtain cristallinity values equal to a density of 1.403–1.415 g/cm$^3$ and a temperature between 230° and 245° C. in the polycondensation stage in order to obtain an optimal reaction rate combined with a low degree of polymer degradation.

An inert gas, preferably nitrogen, is utilised to remove the by-products formed during the polycondensation stage. The gas is recycled after purification of its by-products.

When the content of water in the recycled gas is too high the reactions of hydrolytic scission of the polymer increase highly; when the content of glycol exceeds a limit value the speed of reaction is significantly decreased.

High values of oxygen and acetaldehyde determinate discoloration in the formed article; high values of acetaldehyde are not allowed in the articles set for the food sector.

To limit the costs of purification of gas to be recycled and the energetic costs of maintaining the gaseous flow, the ratio R between the hourly mass-flow by weight of the gas and hourly mass-flow by weight of the polymer leaving the reactor is kept in the range from 0.7:1 to 3:1, preferably from 1:1 to 2:1.

Using values lower than 0.7 (0.5 and 0.3 in the examples) and operating in the conditions reported in U.S. Pat. No. 4,064,112 (crystallization temperatures of 235° C. and polycondensation temperature of 230° C.) the intrinsic viscosity of the polymer does not increase significantly.

Moreover there is an increase in the difference of temperature through the section of the reactor using ratios lower than 0.7.

U.S. Pat. No. 4,161,578 describes a crystallization/polycondensation process in the solid state in which the polymer in granules is crystallized in an apparatus with a forced circulation equipment operating at temperatures between 180° and 235° C. until obtaining a cristallinity degree corresponding to a density of at least 1.385 g/cm$^3$ and subsequently fed to the forced polycondensation reactor in which the polymer is heated at temperatures higher than the ones used in the crystallization stage.

In the polycondensation reactor nitrogen is made to circulate upstream with the feeding of the polymer, with flow ratio by weight comprised between 0.7 and 3.5 kg N$_2$/kg PET. In a previous patent application by Applicant it had been found that it was possible to operate with ratios R lower than 0.6 and remove efficiently the by-products of the SSP reaction succeeding in this way in obtaining high kinetics of reaction.

The polyester resin subjected to SSP had values of IV not lower than 0.6 dl/g.

Operating with low starting IV in order to reach the same final IV, the generation of organic reaction by-products is much higher and so the concentration of glycol and other organic products in the inert gas flow is higher for the same ratio R gas/solid utilized.

In FIG. 1 it is shown the variation in concentration (in kg ethylene glycol/kg nitrogen) in relation to the ratio R gas/solid (kg nitrogen/kg PET ) for two different cases:

a) polycondensation in the solid state starting from IV=0.2 with target IV=0.8 dl/g;

b) polycondensation in the solid state starting from IV=0.6 with target IV=0.8 dl/g.

It has now been found that, even using ratios R comprised between 0.1 and 0.6, it is surprisingly possible to remove efficiently the polycondensation reaction by-products thus obtaining high kinetics of reaction even when the polyester resin to be subjected to polycondensation in the solid state has a relatively low intrinsic viscosity comprised from 0.1 to 0.45 dl/g.

The use of these low ratios allows high energy savings in the operation of gas blowing.

The ration R to be used is preferably comprised between 0.2 and 0.5.

In the process of the invention, the polycondensation reaction is carried out at a temperature comprised between 180° and 250° C., preferably between 210° and 235° C. The degree of crystallinity of the polymer to undergo the SSP reaction is generally comprised between 40 and 50% by weight.

The prepolymer is generally in the shape of spheroidal or lenticular particles obtained for example by letting the polymer pass through a perforated head and collecting the obtained polymer drops in a water bath.

The flow of inert gas leaving the SSP reactor undergoes purification processes leading to the elimination of the impurities of the organic products present in it. The operation is carried out according to the process described in the WO-A-95 02 446 whose description is herewith incorporated by reference.

The average residence times in the SSP reactor are sufficiently long in order to obtain an increase in the intrinsic viscosity of the polymer of at least 0.3 dl/g; in general they are comprised between 15 and 40 hours. The kinetic increase of the intrinsic viscosity can be highly enhanced if the polymer is mixed in the melt state, in a stage prior to crystallization, with a polyfunctional compound containing two or more groups able to react through addition reaction with the terminal groups OH and COOH of the polyester. Examples of these compounds are pyromellitic anhydride and generally the dianhydrides of aromatic or aliphatic tetracarboxylic acids. These compounds are used in a quantity generally comprised between 0.01 and 2% by weight on the polymer.

Pyromellitic anhydride is the preferred compound. The use of these compounds is described in EP-B-422 282 and in U.S. Pat. No. 5,243,020, U.S. Pat. No. 5,334,669 and U.S. Pat. No. 5,338,808 whose description is herewith incorporated by reference.

The polyester resins utilised in the process of the invention comprise the polycondensation products of diols $C_2$–$C_{12}$ such as for example ethylenic glycol, butylenic glycol, 1,4 cyclohexanedimethylol with bicarboxylic aromatic acids, such as terephtalic acid, 2,6 nafphthtalene dicarboxylic acid or reactive derivatives of these such as the low alkyl esters e.g. the dimethyl terephthalate.

Polyethylene terephtalate and polybutylene terephthalate are the preferred resins.

Part of the terephtalic units can be substituted by units deriving from other bicarboxylic acids such as isophtalic acid and naphthalene dicarboxylic acid in quantities comprised from 0.5 to 20% by weight.

The following examples are provided to illustrate but not to limit the invention.

The intrinsic viscosity reported in the text and in the examples is measured in a solution of 0.5 g of polymer in 100 ml of a solution 60/40 by weight of phenol and tetrachloroethane at 25° C. according to ASTM 4603-86.

EXAMPLE 1

PET in granular form with IV=0.20 dl/g, previously crystallized to a cristallinity value of 40%, has been fed, after having been heated at 215° C., in a fluid-bed reactor for polycondensation in the solid state with a mass flow of 5 kg/h. The reactor is fed upstream with nitrogen with a hourly mass flow sufficient to have a ratio by weight (R) between the gas and the fed polymer of 0.4.

The polymer is kept at a temperature of 215° C. with a residence time long enough to allow an increase of 0.55 dl/g of the intrinsic viscosity.

The final IV of the polymer was of 0.75 dl/g.

The residence time was 30 hours.

EXAMPLE 2

Test according to example 1 with the difference that the temperature of the polymer fed and kept in the reactor was 225° C.

The IV of the polymer after 30 hours of residence time was 0.88 dl/g.

EXAMPLE 3

Test according to example 1 with the difference that COPET containing 2% of isophthalic acid was fed.

A IV=0.78 dl/g was obtained with a residence time of 30 hours.

EXAMPLE 4

Test according to example 1 with the difference that polybutylene terephthalate with IV=0.18 dl/g, heated at a temperature of 203° C. is fed and kept in the polycondensation reactor at the same temperature obtaining a IV=0.96 dl/g with a residence time of 30 hours.

COMPARISON EXAMPLE

Example 1 is repeated with the difference that the ratio R was of 0.05. After a residence time of 30 hours, the final IV was of 0.40 dl/g.

What is claimed is:

1. Continuous process for the polycondensation in the solid state of aromatic polyester resins with intrinsic viscosity (IV) comprised between 0.10 and 0.45 dl/g in which the resin is fed from above the mobile bed reactor and released from below and an inert gas is made to circulate upstream and downstream the resin and the reactor temperature is kept between 180° and 250° C. with average residence times of the resin sufficiently long to obtain an increase of at least 0.3 dl/g in the intrinsic viscosity of the polymer, characterized in that the ratio R between the hourly mass flow of the gas and the polymer exiting the reactor is comprised between 0.1 and 0.6.

2. Process according to claim 1 wherein the polymer IV is comprised between 0.15 and 0.30 dl/g.

3. Process according to claim 1 wherein the ratio R is comprised between 0.2 and 0.5.

4. Process according to claim 1 wherein the temperature of the reactor is comprised between 210° and 235° C.

5. Process according to claim 1 wherein the inert gas is nitrogen.

6. Process according to claim 5 wherein the nitrogen is made to circulate downstream with the polymer.

7. Process according to claim 1 wherein the polyester resin is selected from the group consisting of polyethylene terephtalate, copolyethylene terephthalate containing from 1 to 20% of units deriving from isophtalic acid and polibutylene terephalate.

8. Process according claim 1 wherein nitrogen is recycled at the reactor after being purified of organic impurities until reaching impurities values lower than 10 ppm expressed as equivalents of methane.

9. Process according to claim 1 in which to the resin subjected to polycondensation reaction in the solid state is added of a tetracarboxylic acid dianhydride in quantity from 0.01 to 1% by weight.

10. Process according to claim 9 wherein the dianhydride is the pyromellitic dianhydride.

11. Process according to claim 2 wherein the ratio R is between 0.2 and 0.5 dl/g.

12. Process according to claim 2 wherein the temperature of the reactor is between 210° C. and 235° C.

13. Process according to claim 3 wherein the temperature of the reactor is between 210° C. and 235° C.

14. Process according to claim 3, wherein the inert gas is nitrogen.

15. Process according to claim 14 wherein the nitrogen is made to circulate downstream with the polymer.

16. Process according to claim 3, wherein the polyester resin is selected from the group consisting of polyethylene terephthalate, copolyethylene terephthalate containing from 1 to 20% of units deriving from isophtalic acid and polibutylene terephalate.

17. Process according to claim 16, wherein nitrogen is recycled at the reactor after being purified of organic impurities until reaching impurities values lower than 10 ppm expressed as equivalents of methane.

18. Process according to claim 17 in which to the resin subjected to polycondensation reaction in the solid state is added of a tetracarboxylic acid dianhydride in quantity from 0.01 to 1% by weight.

19. Process according to claim 18 wherein the dianhydride is the pyromellitic dianhydride.

20. Process according to claim 4 wherein the inert gas is nitrogen.

* * * * *

UNITED STATES PATENT AND TRADEMARK OFFICE
CERTIFICATE OF CORRECTION

Page 1 of 5

PATENT NO. : 5,739,269
DATED : April 14, 1998
INVENTOR(S) : Hussain AL GHATTA and Dario GIORDANO It is certified that error appears in the above-identified patent and that said Letters Patent is hereby corrected as shown below:

Column 1, Line 3, insert --BACKGROUND OF THE INVENTION--;

Column 1, Line 4, change "refers" to --is directed--;

Column 1, Line 6, delete "three of them";

Column 1, Line 7, delete "the" (both occurrences);

Column 1, Line 8, after "with" insert --a--;

Column 1, Line 9, delete "the"; after "terephtalate" insert a comma;

Column 1, Line 10, after "fields" insert a comma;

Column 1, Line 10, after "and" (second occurrence) insert --a--;

Column 1, Line 11, delete "the" (first occurrence);

Column 1, Line 11, after "films" insert a comma;

Column 1, Line 12, delete "comprised", after "dl/g," insert --the values--;

Column 1, Line 12, change "the " to --a--;

Column 1, Line 13, after "higher" insert --and--, delete "values that";

Column 1, Line 16, do not begin new paragraph;

Column 1, Line 19, delete "comprised";

Column 1, Line 20, do not begin new paragraph;

Column 1, Line 22, change "the same" to --this--;

Column 1, Line 27, after "$CH_2$" add --$CH_2$--;

Column 1, Line 39, change "As already indicated, the" to --The--;

Column 1, Line 41, after "upstream" insert a comma;

Column 1, Line 43, do not begin new paragraph;

UNITED STATES PATENT AND TRADEMARK OFFICE
CERTIFICATE OF CORRECTION

PATENT NO. : 5,739,269
DATED : April 14, 1998
INVENTOR(S) : Hussain AL GHATTA and Dario GIORDANO It is certified that error appears in the above-identified patent and that said Letters Patent is hereby corrected as shown below:

Column 1, Line 45, after "below" insert a comma;

Column 1, Line 48, after "112" insert a comma;

Column 1, Line 50, after "g/cm$^3$" insert a comma;

Column 1, Line 51, after "and" (second occurrence) insert --then--;

Column 1, Line 52, delete "then", insert a comma after "reactor";

Column 1, Line 55, do not begin new paragraph;

Column 1, Line 55, after "stage" insert a comma, after "at" insert --a--;

Column 1, Line 57, change "cristallinity" to --crystallinity--;

Column 1, Line 57, after "g/cm$^3$" insert a comma;

Column 1, Line 58, after "and" (first occurrence) insert --at--;

Column 1, Line 61, change "utilised" to --utilized--;

Column 1, Line 64, do not begin new paragraph, after "high" insert a comma;

Column 1, Line 66, after "value" insert a comma;

Column 2, Line 1, change "determinate" to --cause--;

Column 2, Line 2, change "article;" to --article. Further,--;

Column 2, Line 3, delete "set";

Column 2, Line 5, after "of" insert --the--;

Column 2, Line 10, do not begin new paragraph;

Column 2, Line 10, change "Using" to --When using--;

Column 2, Line 13, after "C)" insert a comma;

Column 2, Line 14, do not begin new paragraph;

UNITED STATES PATENT AND TRADEMARK OFFICE
CERTIFICATE OF CORRECTION

PATENT NO. : 5,739,269
DATED : April 14, 1998
INVENTOR(S) : Hussain AL GHATTA and Dario GIORDANO It is certified that error appears in the above-identified patent and that said Letters Patent is hereby corrected as shown below:

Column 2, Line 14, after "Moreover" insert a comma;

Column 2, Line 21, after "C" insert a comma;

Column 2, Line 21, change "cristallinity" to --crystallinity--;

Column 2, Line 22, after "and" insert --then--;

Column 2, Line 26, do not begin new paragraph, after "reactor" insert a comma;

Column 2, Line 28, delete "comprised";

Column 2, Line 29, after "Applicant" insert a comma;

Column 2, Line 31, change "remove efficiently" to --efficiently remove--;

Column 2, Line 34, do not begin new paragraph;

Column 2, Line 35, change "Operating" to --When operating--;

Column 2, Line 35, after "with" insert --a--;

Column 2, Line 37, after "higher" insert a comma;

Column 2, Line 37, change "so" to --therefore--;

Column 2, Line 40, delete "in", change "it is shown" to --shows--;

Column 2, Line 44, after "0.8dl/g" insert --and--;

Column 2, Line 46, after "0.8dl/g" insert the following title: "SUMMARY OF THE INVENTION AND DETAILED DESCRIPTION OF THE PRESENTLY PREFERRED EMBODIMENTS";

Column 2, Line 47, after "even" insert --when--, delete "comprised";

Column 2, Line 48, delete "remove";

Column 2, Line 49, after "efficiently" insert --remove--;

Column 2, Line 49, after "by-products" insert a comma;

UNITED STATES PATENT AND TRADEMARK OFFICE
CERTIFICATE OF CORRECTION

PATENT NO. : 5,739,269
DATED : April 14, 1998
INVENTOR(S) : Hussain AL GHATTA and Dario GIORDANO It is certified that error appears in the above-identified patent and that said Letters Patent is hereby corrected as shown below:

Column 2, Line 50, after "reaction" insert a comma;

Column 2, Line 56, change "ration" to --ratio--, delete "comprised";

Column 2, Line 58, after "the" (second occurrence) insert --present--;

Column 2, Line 59, delete "comprised";

Column 2, Line 62, delete "comprised";

Column 2, Line 65, after "obtained" insert a comma;

Column 2, Line 65, after "example" insert a comma;

Column 3, Line 5, after "446" insert a comma;

Column 3, Line 9, change "dl/g; in general" to --dl/g. In general--;

Column 3, Line 10, delete "comprised";

Column 3, Line 20, do not begin new paragraph;

Column 3, Line 23, after "808" insert a comma;

Column 3, Line 25, change "utilised" to --utilized--;

Column 3, Line 25, after "the" (third occurrence) insert --present--;

Column 3, Line 27, after "$C_{12}$" insert a comma;

Column 3, Line 30, after "these" insert a comma;

Column 3, Line 31, after "esters" insert a comma;

Column 3, Line 32, do not begin new paragraph;

Column 3, Lines 36-37, delete "comprised";

Column 3, Line 46, change "cristallinity" to --crystallinity--;

Column 4, Line 7, after "C" insert a comma;

UNITED STATES PATENT AND TRADEMARK OFFICE
CERTIFICATE OF CORRECTION

PATENT NO. : 5,739,269
DATED : April 14, 1998
INVENTOR(S) : Hussain AL GHATTA and Dario GIORDANO It is certified that error appears in the above-identified patent and that said Letters Patent is hereby corrected as shown below:

Column 4, Line 8, after "temperature" insert a comma;

On the Cover Page, in the Abstract, Line 3, delete "comprised";

On the Cover Page, in the Abstract, Line 6, delete "comprised".

Signed and Sealed this

Twenty-third Day of February, 1999

*Attest:*

Q. TODD DICKINSON

*Attesting Officer*  *Acting Commissioner of Patents and Trademarks*